United States Patent [19]

Reynolds, III et al.

[11] Patent Number: 4,715,707

[45] Date of Patent: Dec. 29, 1987

[54] LASER DOPPLER VELOCIMETER WITH LASER BACKSCATTER DISCRIMINATOR

[75] Inventors: Albert H. Reynolds, III, St. Louis County; Ernie C. McDaniel, St. Charles County; Roland E. Juhala, St. Charles, all of Mo.

[73] Assignee: McDonnell Douglas Corporation, St. Louis, Mo.

[21] Appl. No.: 847,723

[22] Filed: Apr. 3, 1986

[51] Int. Cl.$^4$ .......................... G01P 3/36; G01S 7/48
[52] U.S. Cl. .................................. 356/28.5; 342/192; 342/104
[58] Field of Search ............... 356/28.5; 342/192, 104, 342/116

[56] References Cited

U.S. PATENT DOCUMENTS

| | | | |
|---|---|---|---|
| 3,856,402 | 12/1974 | Low et al. | 356/28.5 |
| 3,984,685 | 10/1976 | Fletcher et al. | 356/28.5 |
| 3,984,686 | 10/1976 | Fletcher et al. | 356/28.5 |
| 4,167,329 | 9/1979 | Jelalian et al. | 356/28.5 |
| 4,284,351 | 8/1981 | Alldritt et al. | 356/28.5 |
| 4,610,540 | 9/1986 | Mossey | 356/28.5 |

OTHER PUBLICATIONS

T. Sato et al, Applied Optics, vol, 17, No. 2, 15 Jan. '78, p. 230.

Primary Examiner—Stephen C. Buczinski
Attorney, Agent, or Firm—Rogers, Howell, Moore & Haferkamp

[57] ABSTRACT

A laser doppler velocimeter with laser backscatter discrimination for determining the relative velocity between an optical platform and another target where a laser beam is generated and directed toward the target. A detector produces a doppler signal in response to the detection of the laser beam. Noise and backscatter signals with bandwidths and amplitudes outside selected thresholds are rejected, and the legitimate doppler signal from the target is enhanced.

9 Claims, 21 Drawing Figures

LASER DOPPLER VELOCIMETER WITH LASER BACKSCATTER DISCRIMINATOR

BACKGROUND AND SUMMARY OF THE INVENTION

This invention generally relates to a laser doppler velocimeter, and more particularly to such a velocimeter having laser backscatter discrimination.

It is known in the art that a laser may be used in a velocimeter to determine the velocity of particles in a moving stream of liquid or air, as, for example, in a wind tunnel, to infer the motion of the transporting medium in the vicinity of a solid obstacle. Coherent detection may be used for line-of-sight velocity measurements, while correlation methods may be used to determine the velocity perpendicular to the line-of-sight. A velocimeter of this type, however, uses the return from aerosols or suspensions as its primary signal and would not, therefore, discriminate against such signals in favor of those from a solid target. Generally, a velocimeter of this type also uses a focussed beam to define a sample volume, the velocity of which is to be measured. Focussed beam techniques are not applicable, however, to the small apertures and long ranges typically required for the field operation of a velocimeter designed to measure the velocity of distant, solid targets.

It is also known in the art that a laser may be used in a laser doppler velocimeter (LDV) to determine the relative velocity between an optical platform and another target by measuring the doppler frequency shift using coherent detection techniques. A velocimeter of this type, to be reliable, must provide highly accurate velocity measurements. However, a well known problem with such a device is that created by backscatter from atmospheric conditions such as rain, snow, dust, fog, and the like.

As an attempt to solve the backscatter problem, most prior art designs use some form of frequency modulation to discriminate between legitimate signals from the target and false signals from atmospheric backscatter. However, the use of frequency modulation has disadvantages. The FM transmitter can greatly increase the cost of the device over an unmodulated (CW) approach. The modulated waveform must be carefully controlled and monitored. The discrimination technique based on range can be obscured at short range in the presence of modest winds. Range-doppler coupling can lead to velocity measurement errors especially if the platform is rotating.

As another attempt to solve the backscatter problem, some prior art designs use separate transmit and receive apertures to reduce the signals received from nearby atmospheric scatterers. Separating the apertures, however, results in only a modest decrease in returns from atmospheric backscatter, introduces higher costs due to the extra optics, and greatly increases the sensitivity to optical misalignment.

The laser backscatter discriminator (LBD) of the present invention optimizes the detection of signals from solid targets while rejecting signals due to atmospheric backscatter to detect the valid doppler signal for highly accurate velocity measurements. The laser backscatter discriminator of the present invention allows the use of a simple CW transmitter, and yet provides the system at substantially reduced costs and increased reliability and accuracy as compared to the FM approach.

By way of summary, the system of the present invention combines a simple, low cost, unmodulated (CW) transmitter with a compressive surface acoustic wave (SAW) spectrum analyzer receiver to provide unambiguous, high accuracy velocity measurements with a high utility. Signals from atmospheric backscatter and noise signals are rejected based on bandwidth and amplitude thresholds, while legitimate doppler signals are enhanced using spectral averaging and derivative processing techniques.

The system of this invention can be used in any application that requires an accurate measurement of the line-of-sight relative velocity between the transmitting platform and another target. The platform may be in a moving vehicle, or can be stationary with the beam directed at or scanned in the direction of a moving target.

DETAILED DESCRIPTION OF THE PREFERRED EMBODIMENT

Figure 1:
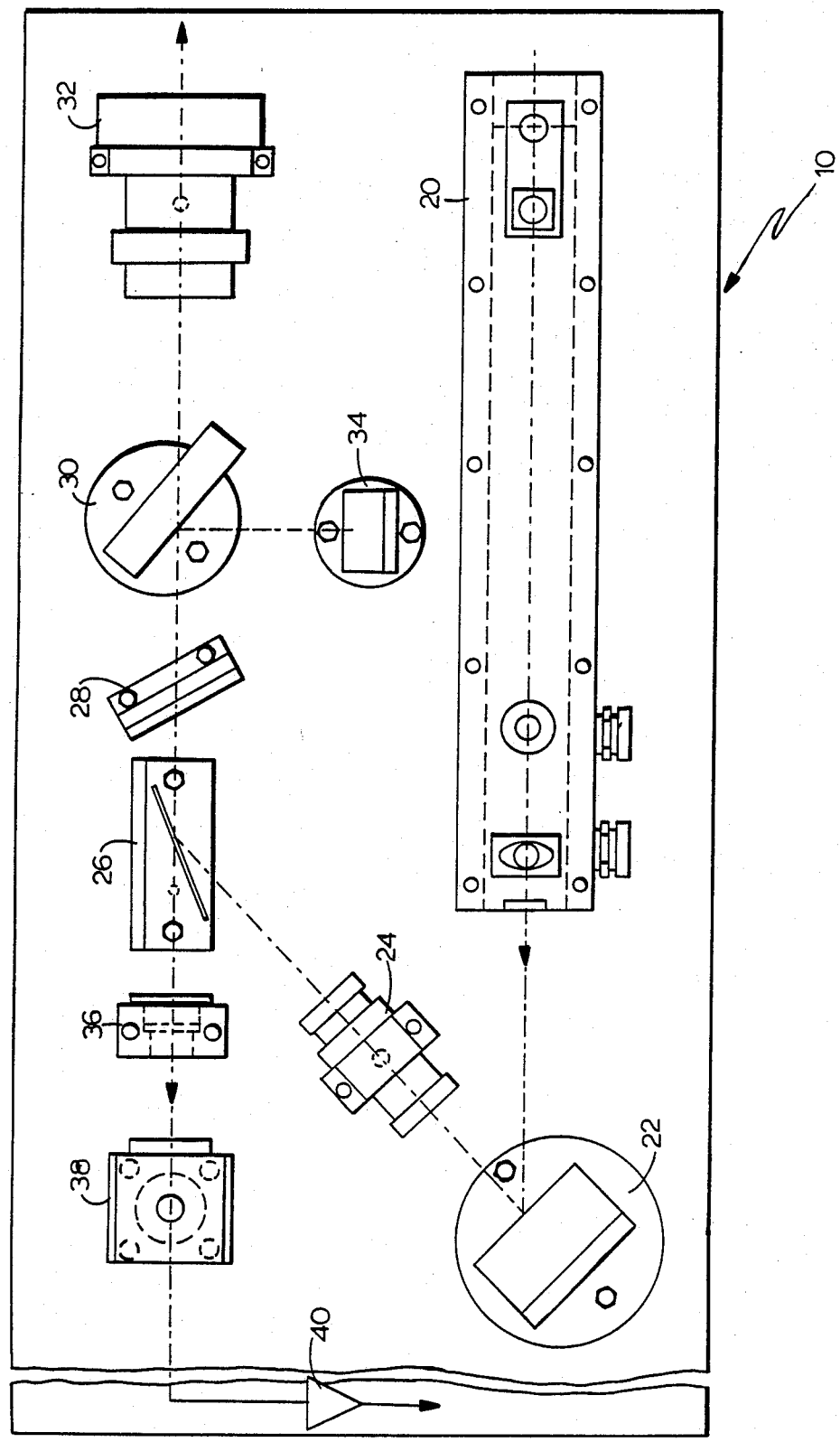
FIG. 1 is a schematic illustration of a CW laser/doppler velocimeter used with the present invention.

With reference to the drawing, FIG. 1 illustrates a CW laser/doppler velocimeter 10 that may be used with the present invention. The laser doppler velocimeter (LDV) includes a CW $CO_2$ laser 20, which may be a five watt laser emitting light at 10.6 microns. The laser beam is directed toward a mirror 22 where it is reflected through a telescope beam expander 24 to a brewster plate polarizer 26. From there the beam is directed through a quarter-wave plate 28 to a beam splitter (partial reflector) 30. One of the split beams is directed through a telescope 32 toward the target. The other split beam from the beam splitter 30 is directed to a mirror 34 from which it is reflected back to the beam splitter 30 and then to the left through the quarter-wave plate 28, brewster plate polarizer 26, and a lens 36 to a detector 38. The beam from the target is directed back to the left through the telescope 32, beam splitter 30, quarter-wave plate 28, brewster plate polarizer 26, and lens 36 to the detector 38.

The telescopes 24 and 32 collimate and enlarge the beam. The quarter-wave plate 28 converts the beam in one direction from linear to circular polarity, and in the opposite direction from circular to linear polarity.

The detector, which may be of the mercury cadmium telluride type, detects a difference in frequency between the laser frequency as detected from the mirror 34, and the laser frequency as detected from the target. This difference frequency is the doppler frequency.

Figure 2:
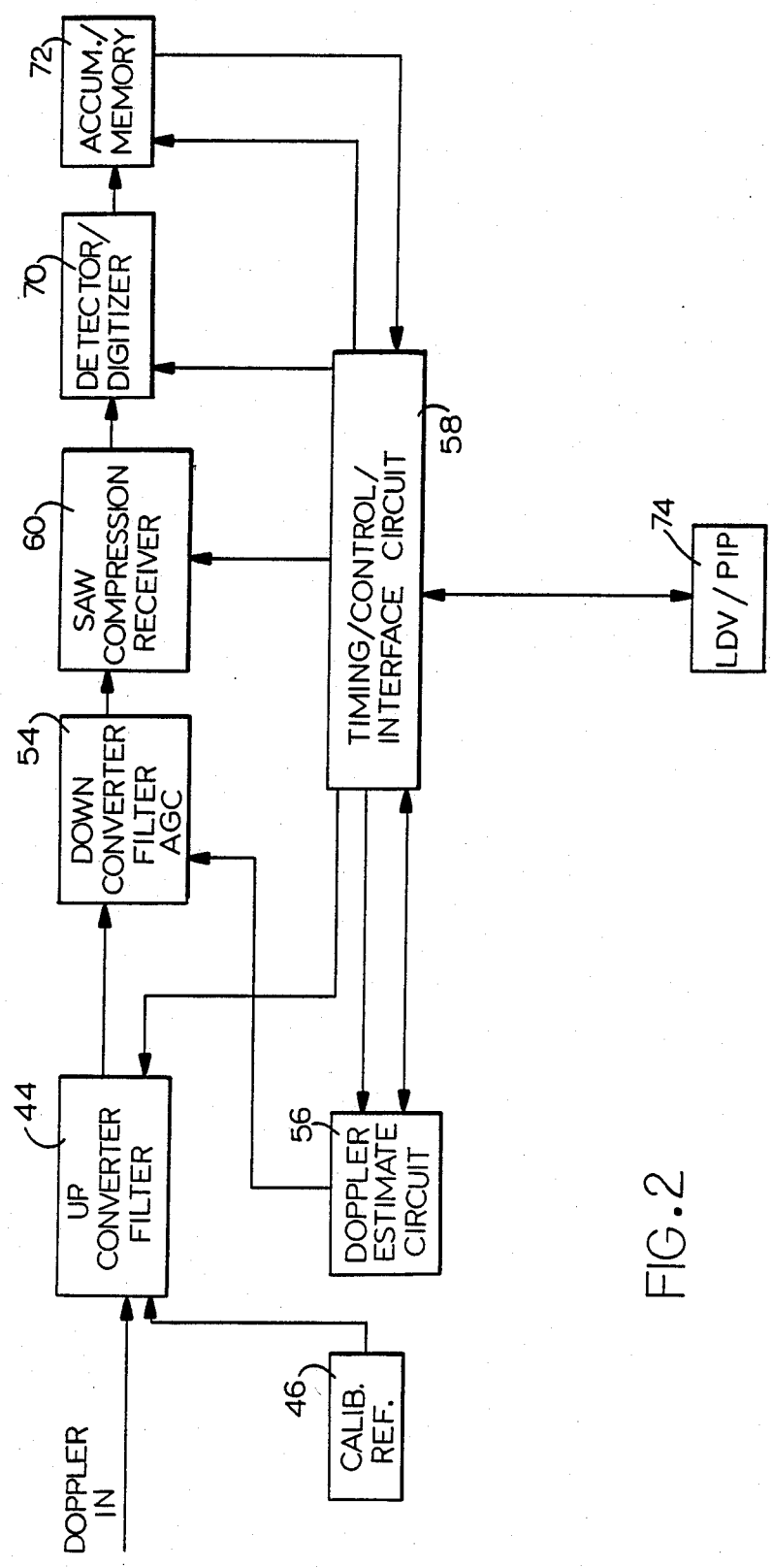
FIGS. 2-6 are schematic block diagrams of the hardware portion of the system of the present invention.
Figure 3:
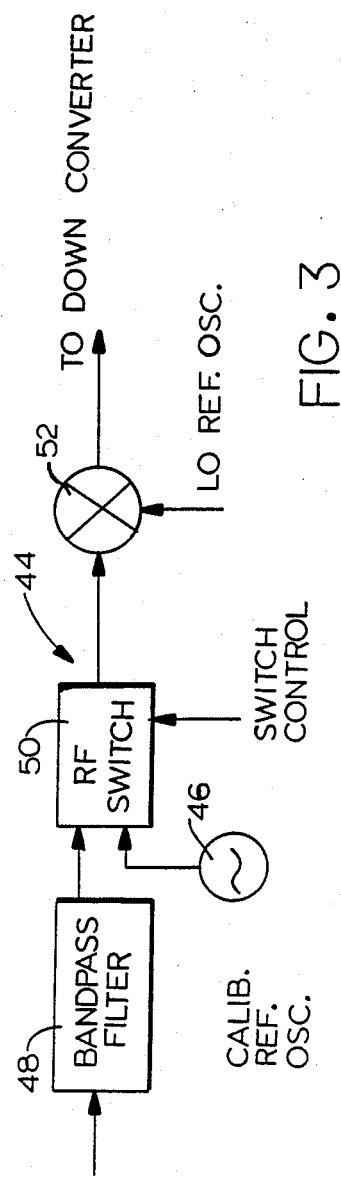

With reference to FIGS. 2-6, there are shown electrical schematic diagrams of the laser backscatter discriminator of the present invention. The doppler signal from the detector 38 goes to a pre-amplifier 40 (FIG. 1) to one input of an up converter/filter network 44 (FIG. 2). Another input of the network 44 is from a calibration reference 46. The network 44 and calibration reference 46 are shown in more detail in FIG. 3. The network 44 includes a bandpass filter 48 and an RF switch for switching either the calibration reference 46 or the amplified and filtered doppler signal to a mixer 52 where the filtered signal is mixed with a mix frequency from a LO reference oscillator.

The signal from the network 44 goes to a down converter/filtering/AGC network 54, that also has an input from a doppler estimate circuit 56. The network 54 prepares the signal for further processing by a surface acoustic wave (SAW) compressive receiver 60. The network 54 locates the doppler signal within the frequency range of the SAW receiver for further processing.

Figure 4:
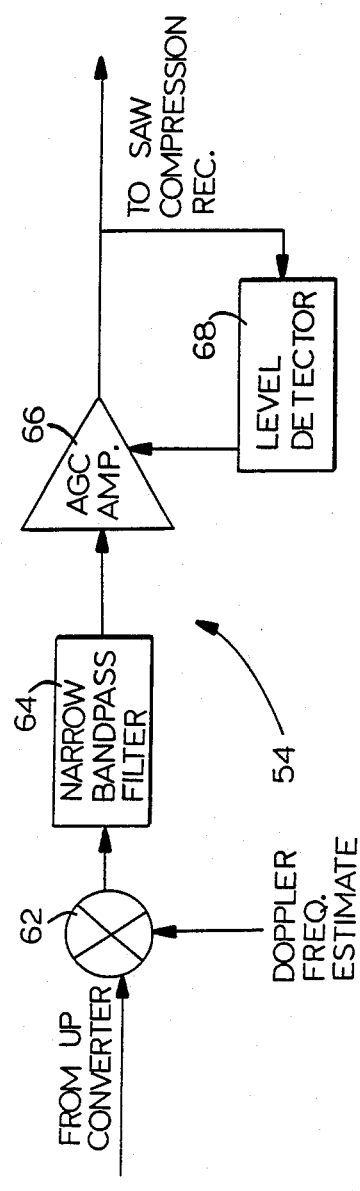

The network 54 is shown in more detail in FIG. 4. The signal from the network 44 is fed to a mixer 62 where it is mixed with a signal from the doppler estimate circuit 56. The circuit 56 is shown in more detail in FIG. 5 and will be further described. Its purpose is to provide both an estimate of the doppler frequency and an estimate of the doppler frequency rate-of-change for a given application so as to reduce the amount of processing required to detect valid doppler signals.

The output of the mixer 62 goes through a narrow bandpass filter 64 and is amplified by means of an amplifier 66 and level detector 68, such that the output of the amplifier 66 is only that portion of the signal to be processed by the SAW compressive receiver, and so that the power of the amplifier output signal is constant so as not to saturate the SAW receiver. That signal is then fed to the SAW compressive receiver 60 which processes the signal by performing what is essentially a spectrum analysis. The signal from the SAW receiver is fed to a detector/digitizer 70 which detects the envelope from the SAW signal and digitizes the signal. The digitized signal goes to an accumulator/memory 72 which adds or averages the digital values with corresponding digital values of previous spectra and sends the average values of the samples to an interface circuit 58. The circuit 58 interfaces with a laser doppler velocimeter, post integration processor (LDV/PIP) 74 which includes a microprocessor and associated hardware for processing the data from the interface circuit 58 in accordance with the present invention, and which will be further explained in connection with the flow charts of FIGS. 7-11.

Figure 6:
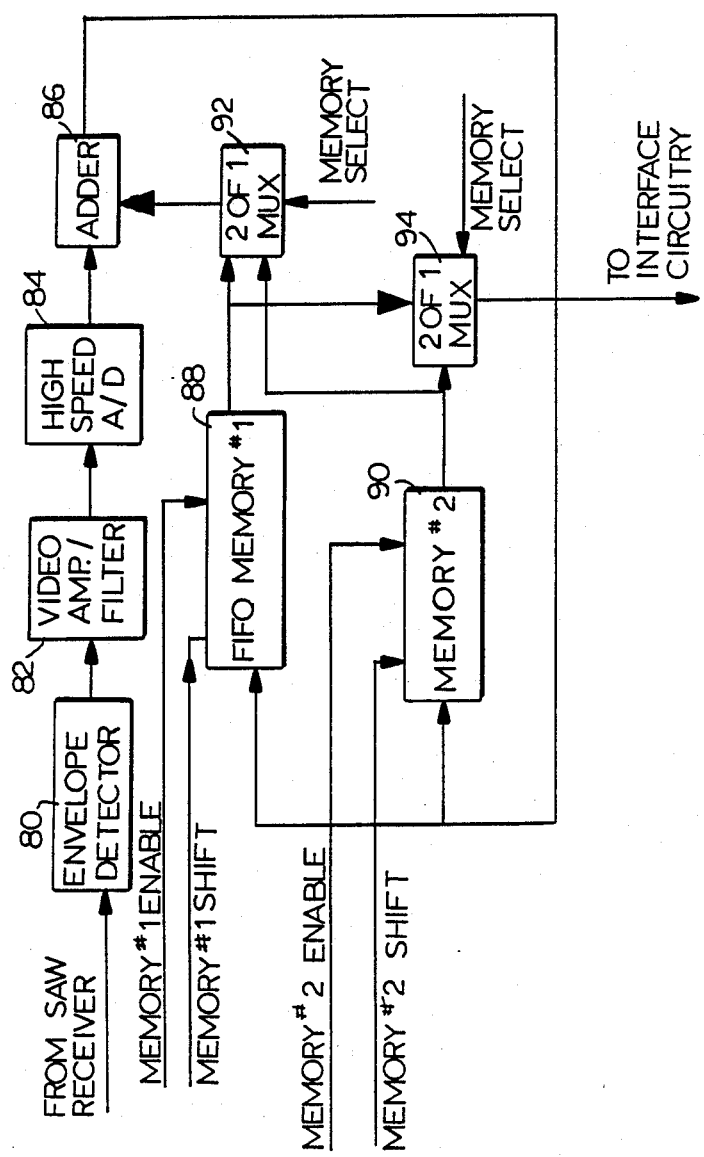

The detector/digitizer 70 and accumulator/memory 72 are shown in more detail in FIG. 6. The signal from the SAW receiver is fed to an envelope detector 80 to detect the envelope of the signal, through a video amplifier/filter 82 and to a high-speed analog to digital converter 84 which digitizes the envelope. These digital signals are averaged or added with corresponding digital signals from previous spectra, and data representing the average spectra are stored in memory. When a predetermined number of spectra have been obtained, the data representing the average of these spectra are used to calculate velocity. There are two memories 88 and 90 and their associated multiplexors 92 and 94 such that data representing the average spectrum is written into one memory while read out of the other to increase the number of spectra that can be processed within a given time interval.

The doppler estimate circuit 56 will be described with reference to FIG. 5. Data from the processor 74 and interface circuit 58 representing an estimate of doppler frequency and an estimate of the rate of change of doppler frequency, are fed to latches 100 and 102, respectively. Data from the latch 100 are fed to an up/down counter 104. The latch 102 has outputs to the counter 104 and a frequency divider 107. The frequency divider also has an output to the counter 104. Data from the latch 102, representing the direction (up or down) of estimated rate of change of doppler frequency, is fed from the latch 102 to the counter 104. The frequency divider modifies the data in the counter 104 to reflect the estimated rate of change of the doppler frequency. The data in the counter 104 goes to a digital to analog, sample and hold, converter 106. The analog signal from the converter 106 goes to a voltage controlled oscillator 108, the frequency output of which is fed to a power splitter 110. Hence, the output of the voltage controlled oscillator 108 is a sine wave at a frequency established in accordance with data from the processor representing an estimated doppler frequency, and where the frequency of the sine wave changes during the integration cycle in accordance with data from the processor representing an estimated rate of change of doppler frequency. One output from the power splitter goes to the mixer 62 of the down converter 54 and becomes the mix frequency for the down converter. The other output from the power splitter goes to a comparator 112 that converts the signal to a square wave, the pulses of which are counted by a frequency counter 114 to give an accurate measure of the mix frequency to the mixer 62. The count is dumped into a latch 116 and from there fed to the interface circuit 58 and processor 74.

Figure 7:
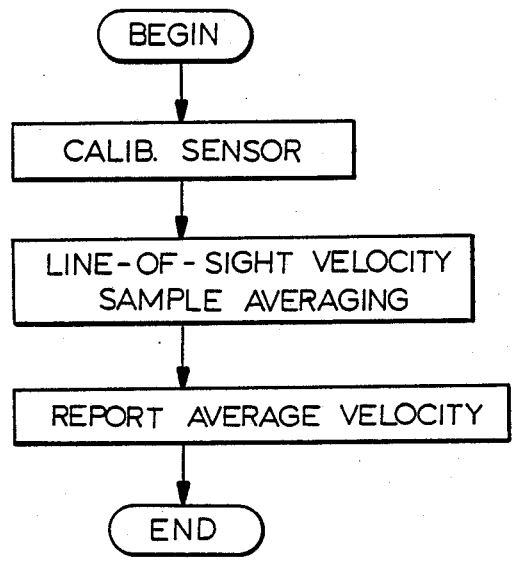
FIGS. 7, 8A-C, 9A-B, 10 and 11 are flow charts of the software used with the system of the present invention.

The operation of the system will be further explained with reference to the block diagrams of FIGS. 2-6, and the flow charts of FIGS. 7-11. The main flow chart is shown in FIG. 7. First the backscatter discrimination system is calibrated, then the line-of-sight velocity samples derived from the average spectra, as will be further explained, are averaged, and then the average velocity is reported.

Figure 8A:
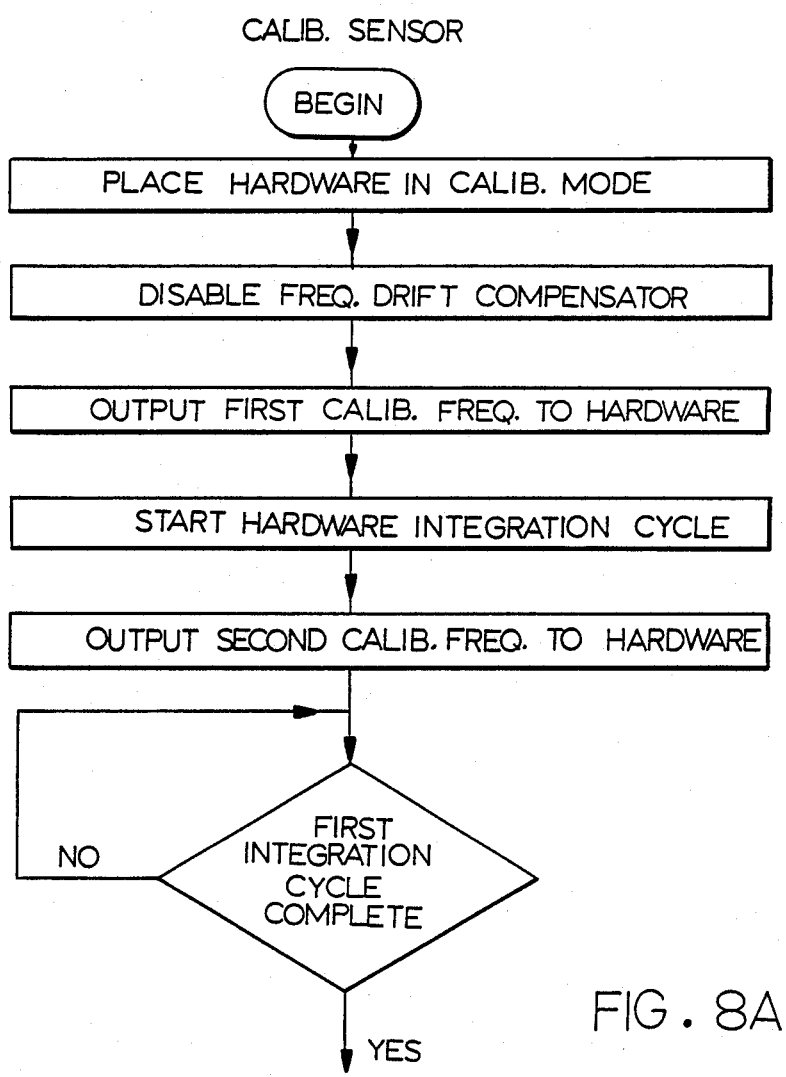
Figure 8B:
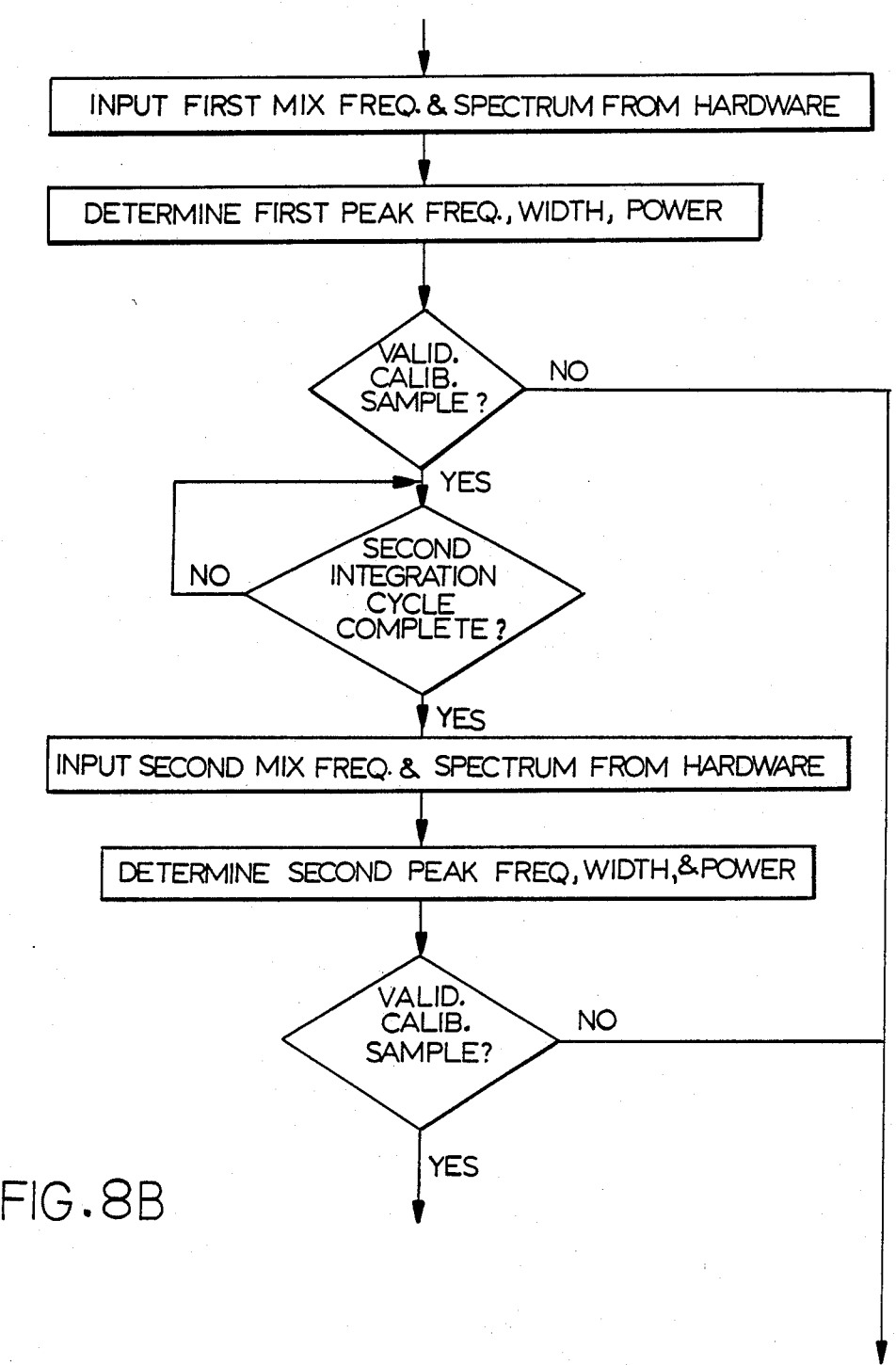
Figure 8C:
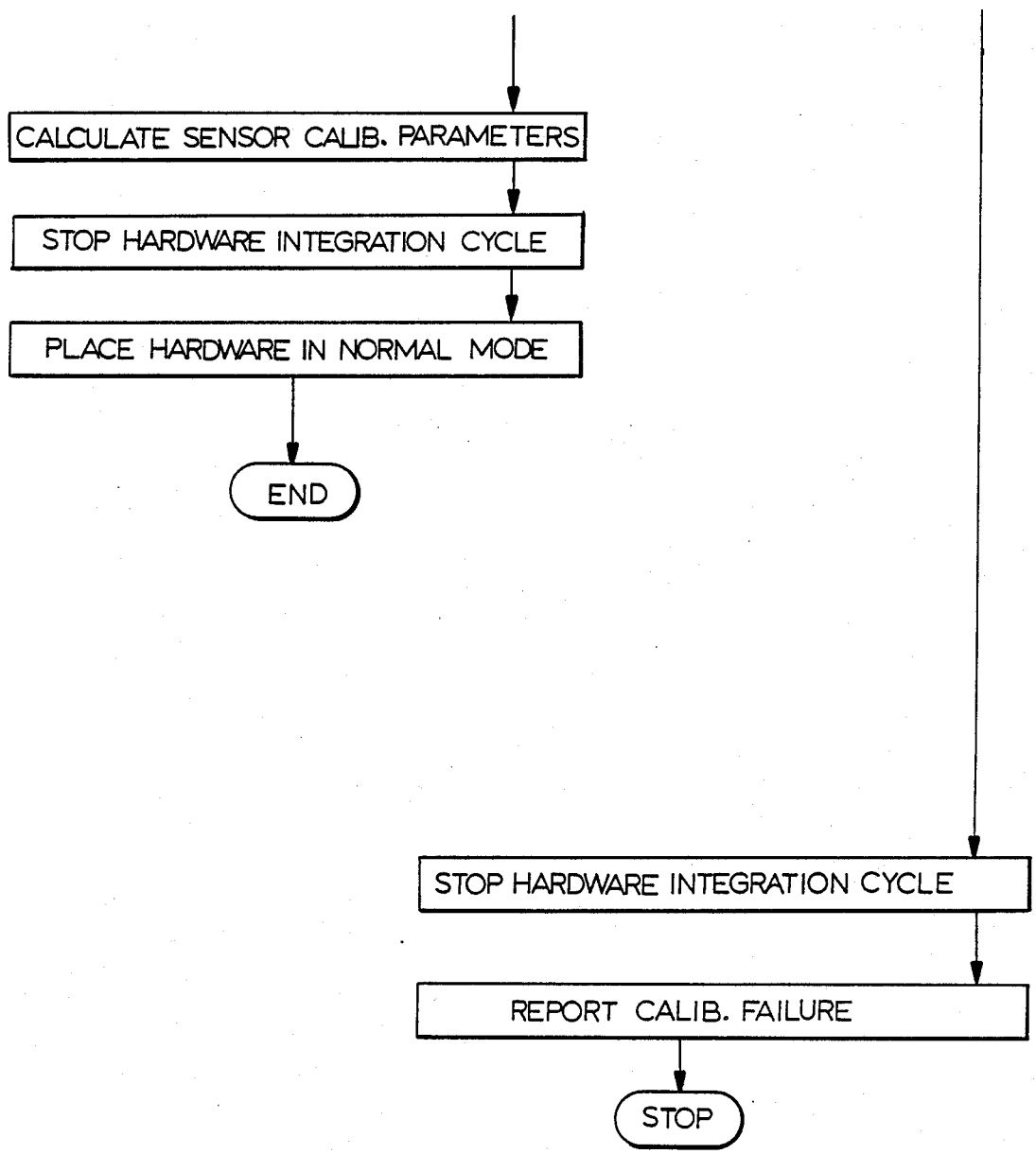
Figure 9A:
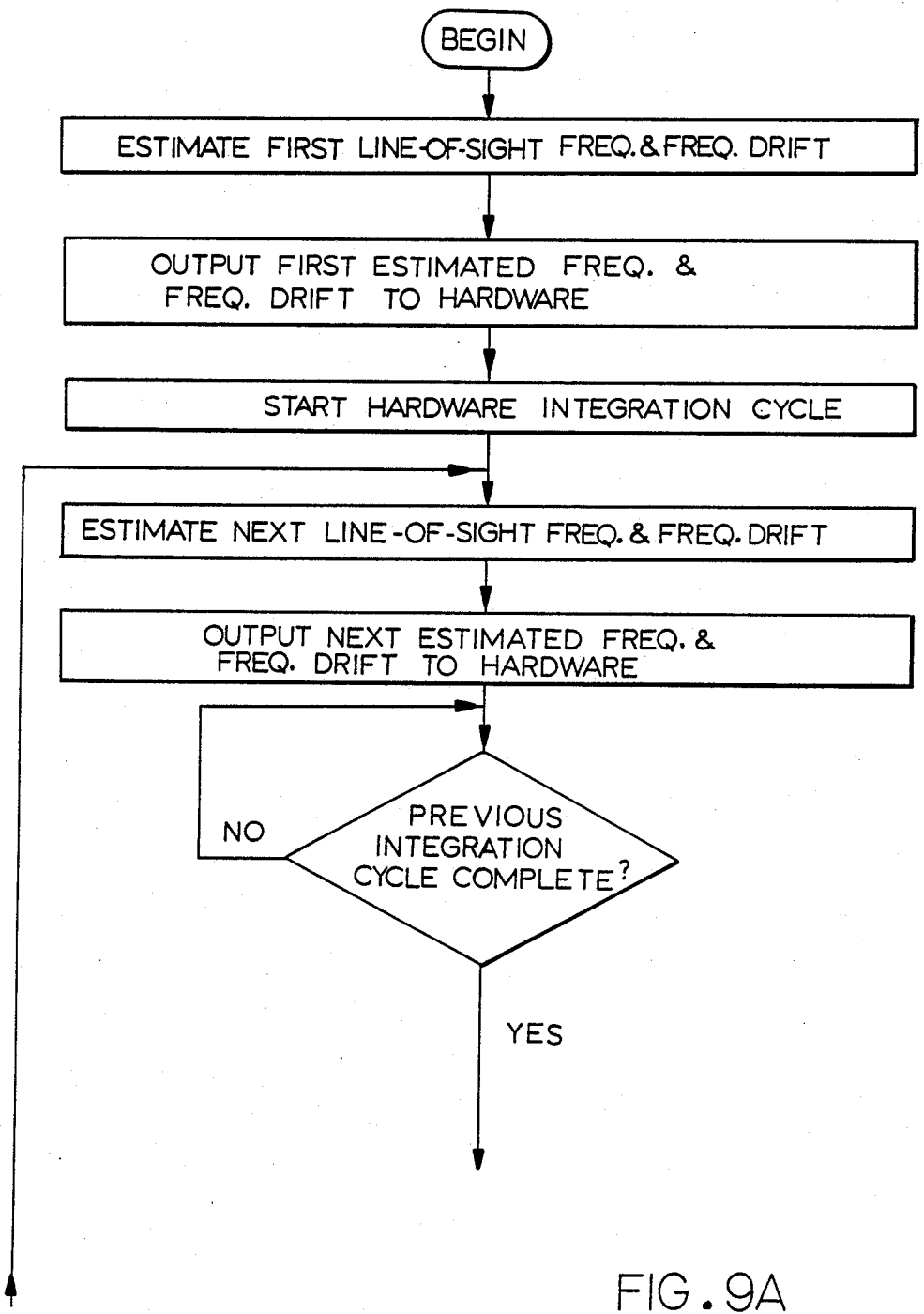
Figure 9B:
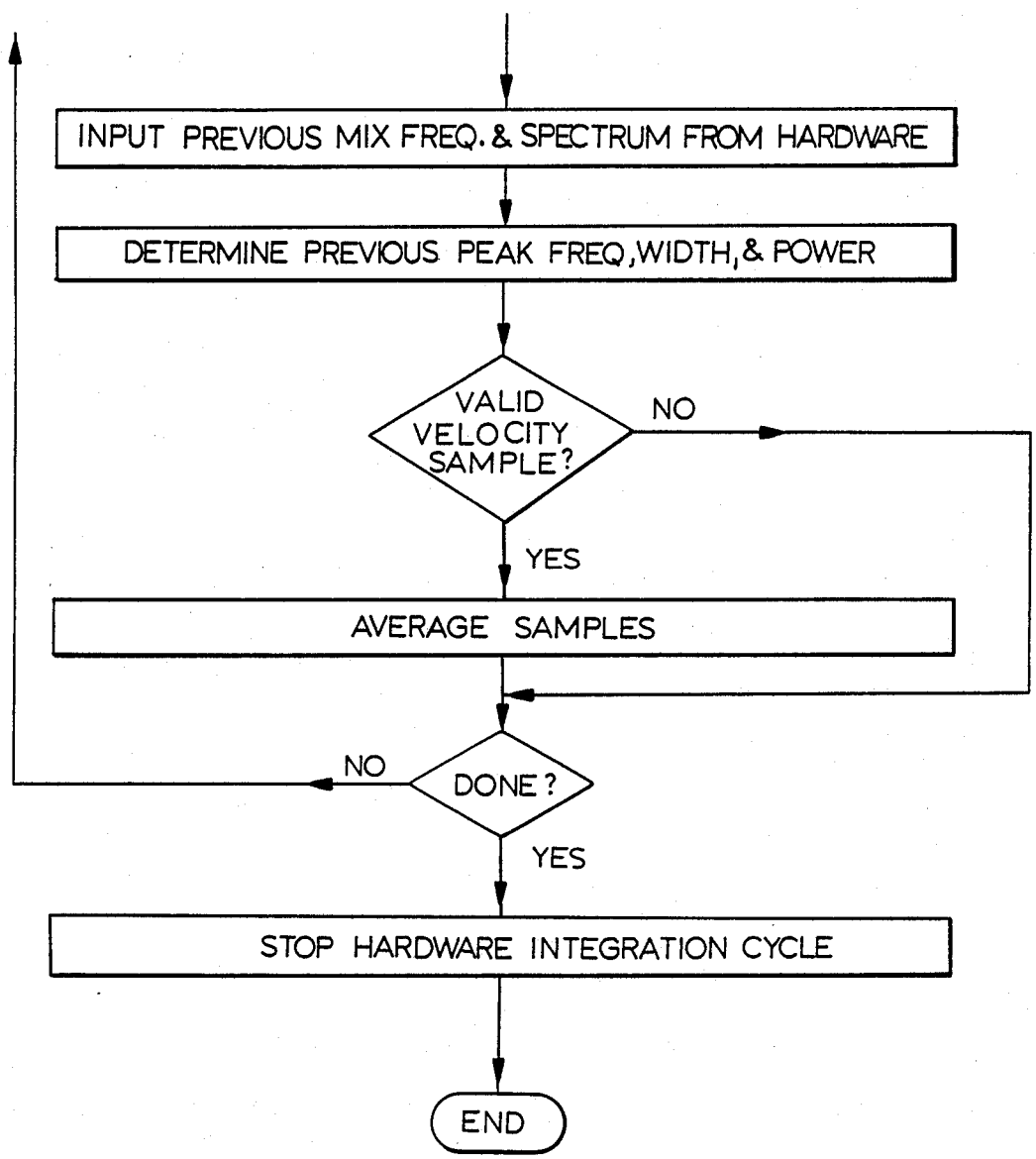

The calibration step is further shown by the flow chart of FIGS. 8A, 8B and 8C. The hardware is placed in the calibration mode by placing the RF switch 50 to input the calibration reference oscillator signal 46 to the mixer 52. The frequency drift or rate of change compensation is disabled by disabling latch 102. Two mix frequencies are used to calibrate the system. Data representing the first such frequency is outputted from the processor 74 and interface circuit 58 to the hardware at the latch 100. The hardware then begins the integration cycle. Data representing a second calibration frequency is outputted to the hardware. After the first integration cycle is complete, the first mix frequency and spectrum is inputted from the hardware to the interface circuit and processor. The mix frequency is inputted by the circuit of FIG. 5 and the spectrum is inputted by the circuit of FIG. 2. Next, the peak frequency, width, and power for the first calibration frequency are determined. This is shown in more detail by the flow chart of FIG. 11.

First the smallest spectrum value is determined. Next the spectral derivative is calculated. The minimum and maximum derivatives are determined, and the width is determined as the difference between the frequencies of minimum and maximum derivatives. The doppler frequency is set equal to the average of the frequencies of the minimum and maximum derivatives, and then the power at peak frequency is determined. These steps will be further explained later in this description with reference to a specific example and the waveforms of FIGS. 12–18.

Figure 10:
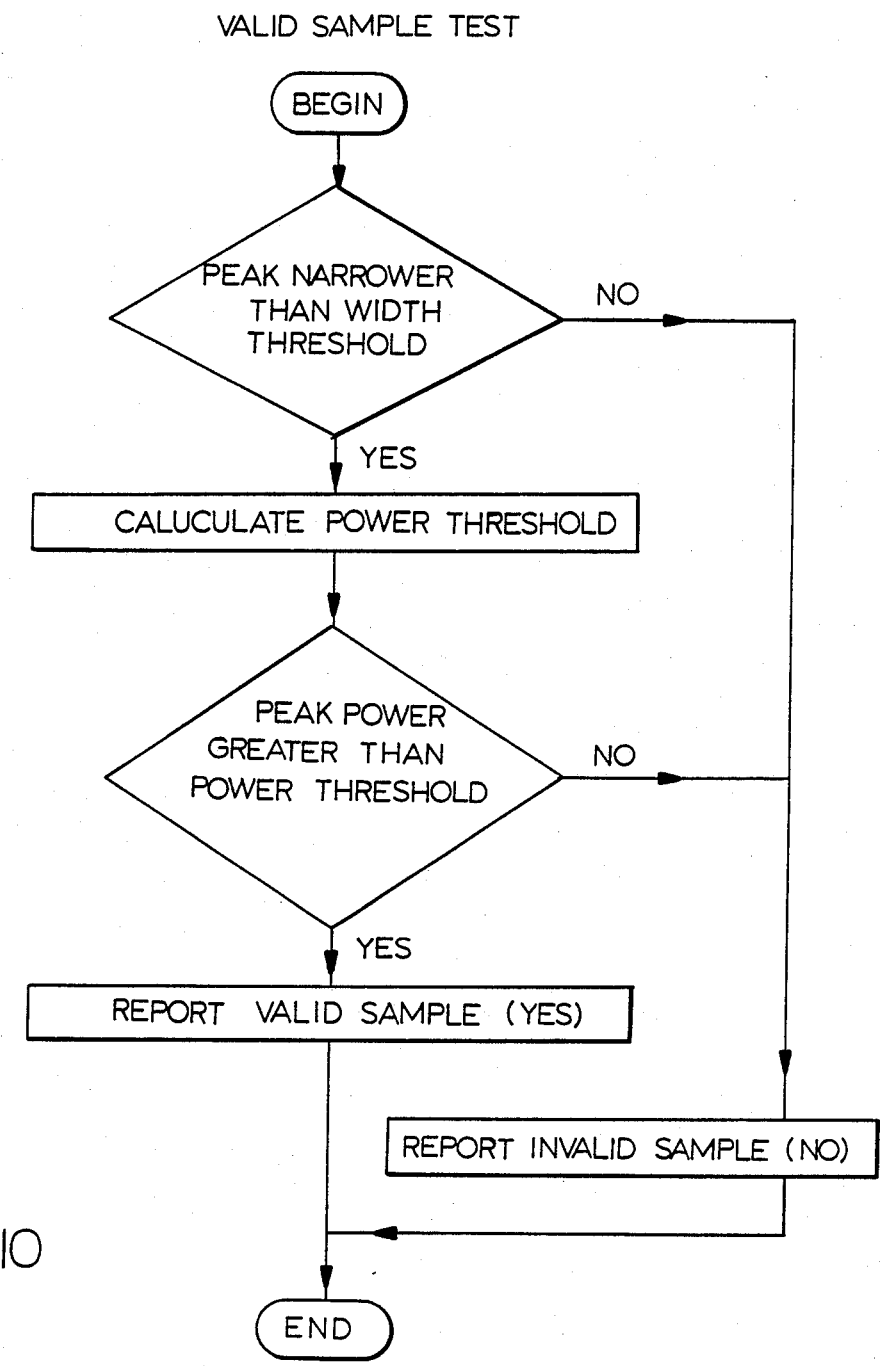
Figure 11:
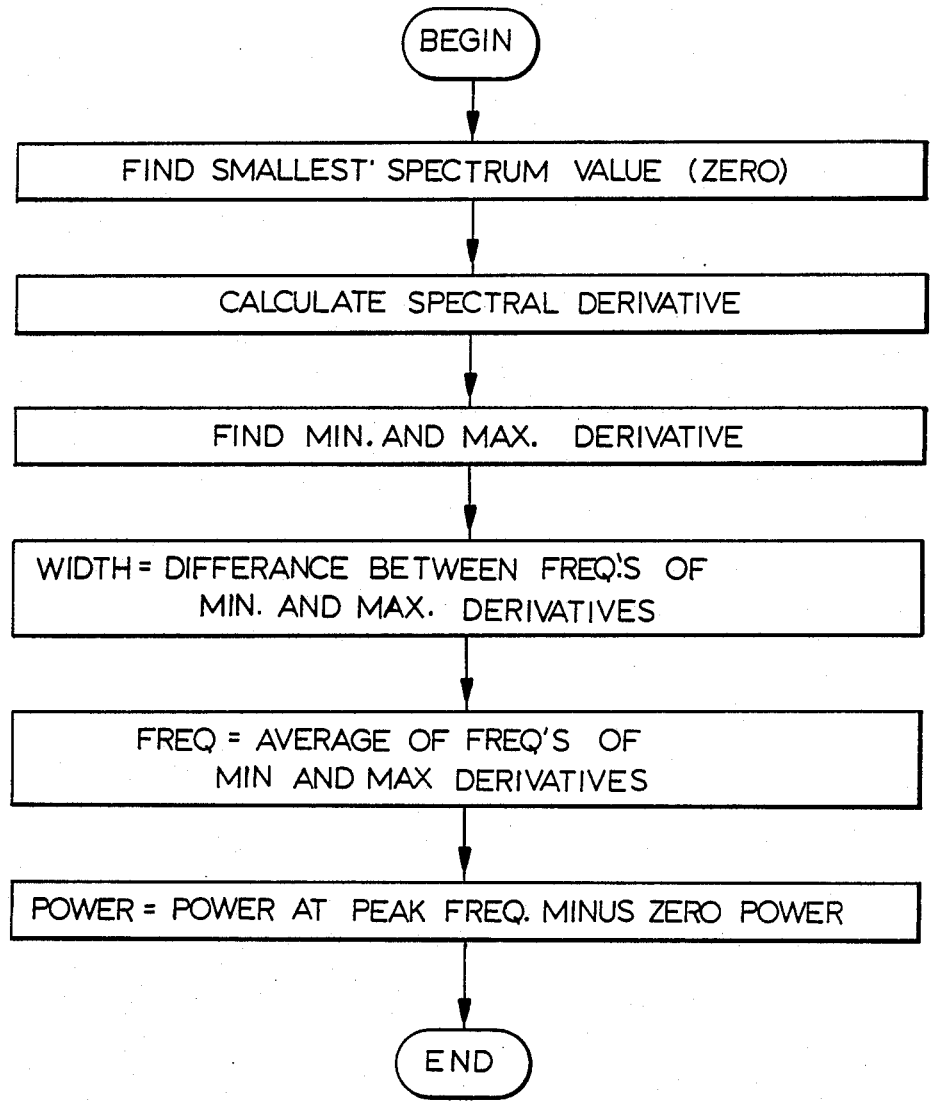

FIG. 10 is the flow chart for determining whether the first calibration sample is valid. If the peak width is narrower than a threshold value, then a power threshold is calculated. If the peak power is greater than the power threshold, the calibration sample is reported as valid. If either of the threshold tests fails, the calibration sample is reported as invalid. The calibration mode should meet these threshold tests as the calibration signal is selected to be sufficiently narrow and of sufficient power.

Referring back to FIG. 8, if the first calibration sample is valid, and if the second integration cycle is complete, the second mix frequency and spectrum are inputted from the hardware to the interface circuit and processor. The second peak frequency, width, and power are determined as shown by the flow chart of FIG. 11, and it is determined whether the second calibration sample is valid in accordance with the flow chart of FIG. 10, as with the first calibration sample.

As shown by FIG. 8, if either calibration sample is reported as invalid, the hardware integration cycle is stopped, and the calibration failure is reported indicating that the system cannot be calibrated. This could be the result of either hardware or software failure. If both calibration samples are valid, the calibration parameters are calculated, the hardware integration cycle is stopped, and the hardware is placed in the normal mode by operation of the switch 50 to input the doppler signal to the mixer 52.

Figure 5:
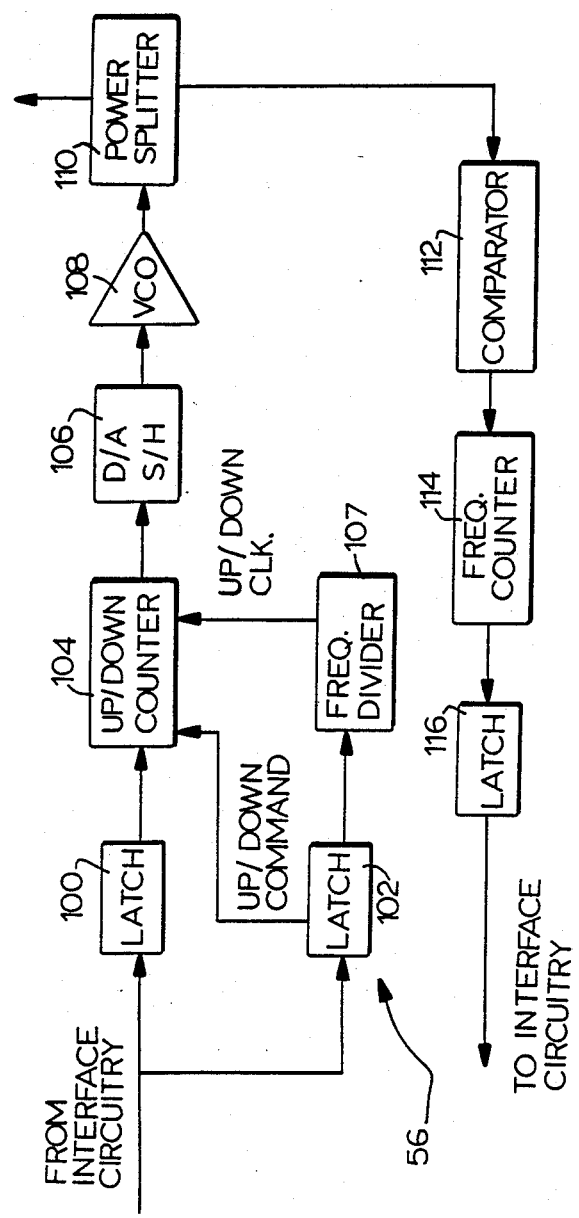

The data from the latch 116 of the circuit in FIG. 5 represents an accurate measure of the actual mix frequency from the power splitter 110 to the down converter 54. An exact measure of the frequency is important because the voltage controlled oscillator may drift. Given the calibration frequency from the calibration reference 46, and given the actual mix frequency as measured at the comparator 112, frequency counter 114, and latch 116, the frequency where the doppler frequency should occur can be calculated. Calibration parameters are adjusted so that the processor's determination of the doppler frequency is equal to the actual doppler frequency as calculated. The calibration parameters are the scale and bias for the voltage control oscillator, and the bandwidth and center frequency for the SAW receiver.

This completes the calibration mode as shown by the flow chart of FIG. 7, and the system is now placed in the mode for actual measurement of the velocity from the detector doppler signal by operation of the RF switch 50. This is shown by the step labeled "Line-Of-Sight Velocity Sample Averaging" in the flow chart of FIG. 7, and in expanded form by the flow charts of FIGS. 9–11. Hence, data representing a first line-of-sight doppler frequency and frequency drift or change are outputted from the processor and interface circuit to the latches 100 and 102 of the doppler estimate circuit 56 for a first velocity measurement sample. Next, the hardware integration cycle is started to average the spectra in accordance with the overall block diagram of FIG. 2. Then, data representing the estimated frequency and frequency drift or change for the next sample are outputted to the doppler estimate circuit 56. When the integration cycle for the first or previous sample is complete, the first or previous mix frequency and spectrum from the hardware are inputted to the interface circuit and processor. Next, the peak frequency, width, and power for the first or previous velocity sample are determined in accordance with the flow chart of FIG. 11 as previously described in connection with the calibration mode. If the velocity sample is valid as determined by the threshold tests of the flow chart of FIG. 10, the velocity samples may be averaged. When all of the velocity samples have been taken and averaged, the hardware integration cycle is stopped and the velocity sample average is used to determine the velocity Criteria may be set up to determine when the process is complete. For example, the criteria may be that the process is complete when a certain number of valid velocity samples is obtained, or when a certain number are valid out of a specific number of velocity samples. When the program of FIGS. 9A & B is complete, and the required number of valid velocity samples have been obtained, the average velocity is reported as shown by the flow diagram of FIG. 7.

Figure 12:
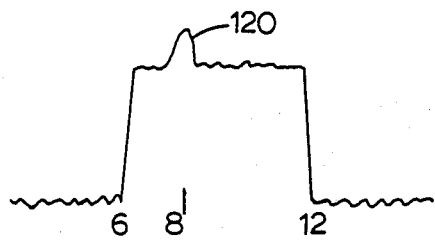
FIGS. 12-18 are waveforms or signals at various locations throughout the system, and are illustrative for purposes of explaining the operation of the system.
Figure 13:

By way of example, the laser frequency may be 28.3 THz. The doppler frequency may be approximately 200 kHz/meter/second. If the estimated velocity at line-of-sight is 40 meters per second, the doppler frequency would be approximately 8 MHz. A reasonable bandwidth for the filter 48 is selected for the particular application. For example, the bandwidth used where the system is for determining the velocity of an aircraft would be different from that used for determining the velocity of a land vehicle. At a doppler frequency of 8 MHz, an appropriate bandwidth for the filter 48 might be 6–12 MHz. Using this bandwidth as an example, the signal at the output of the filter 48 is shown by the waveform of FIG. 12 with the legitimate doppler signal shown by the signal 120 at the top of the waveform. The frequency of the LO reference oscillator is selected to give the weakest spurious signals in the bandpass of the SAW receiver. The bandpass of the SAW receiver in this described embodiment is 159–161 MHz., and by way of example may be an AS 160-2-50 from Phonon Corporation. Such a mix frequency for the present sample is 498 MHz. Hence, the signal at the output of the filter 48 is mixed with a LO reference oscillator frequency of 498 MHz to obtain a waveform at the output of the up converter/filter 44 as shown in FIG. 13.

Figure 14:
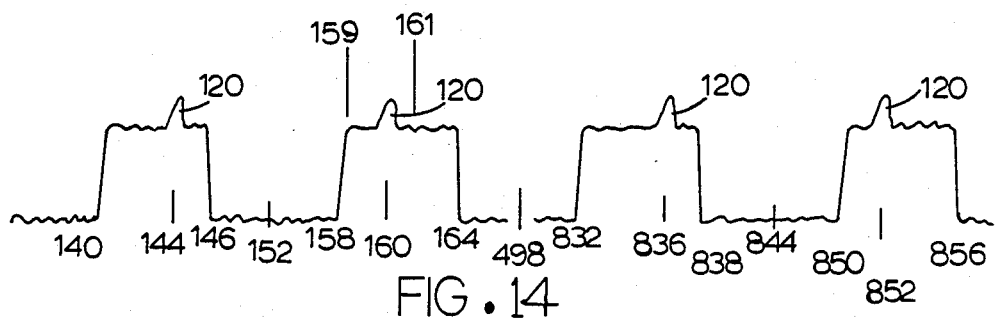

As explained, the SAW receiver used with this example has a bandpass of 159–161 MHz. The doppler signal must appear within this bandwidth for the processing. Hence, the waveform at the output of the up converter 44 is mixed with a frequency from the doppler estimate circuit 56 that will place the doppler signal within the prescribed bandwidth. In this example, a mix frequency of 346 MHz is used to produce a waveform at the output of the mixer 62 of the circuit 56 as shown in FIG. 14. This waveform is passed through a bandpass filter 64 to pass only that part of the waveform between 159–161 MHz. The resultant signal is amplified and fed to the SAW receiver 60.

Figure 15:
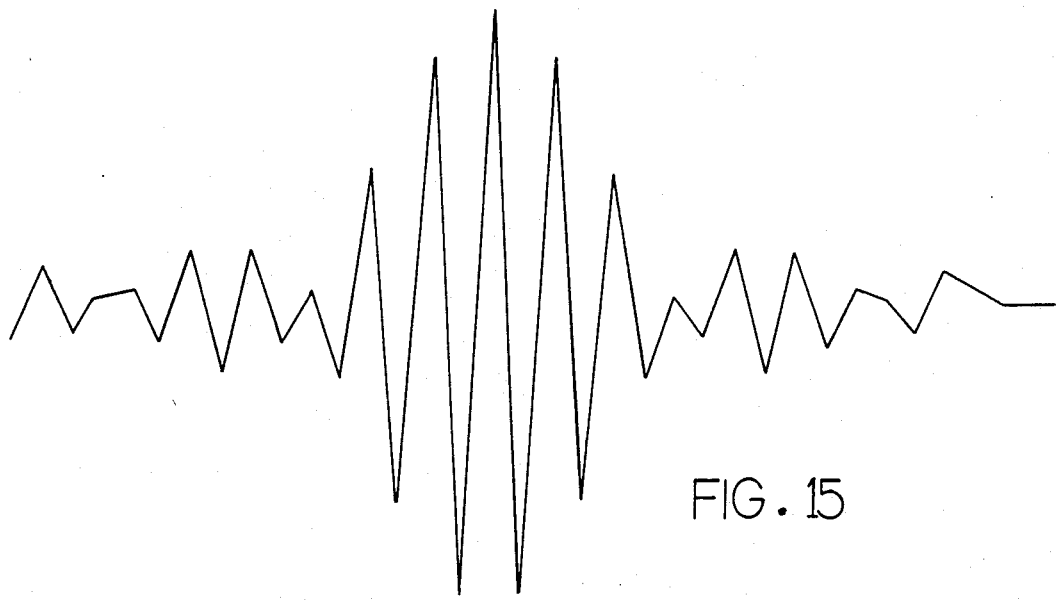
Figure 16:
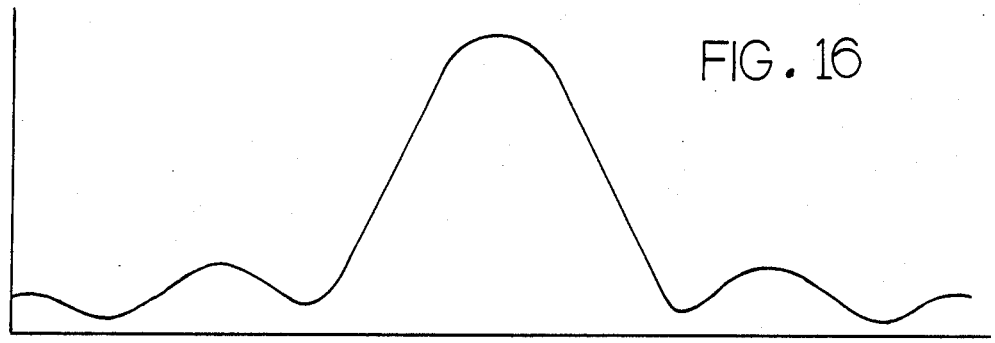
Figure 17:
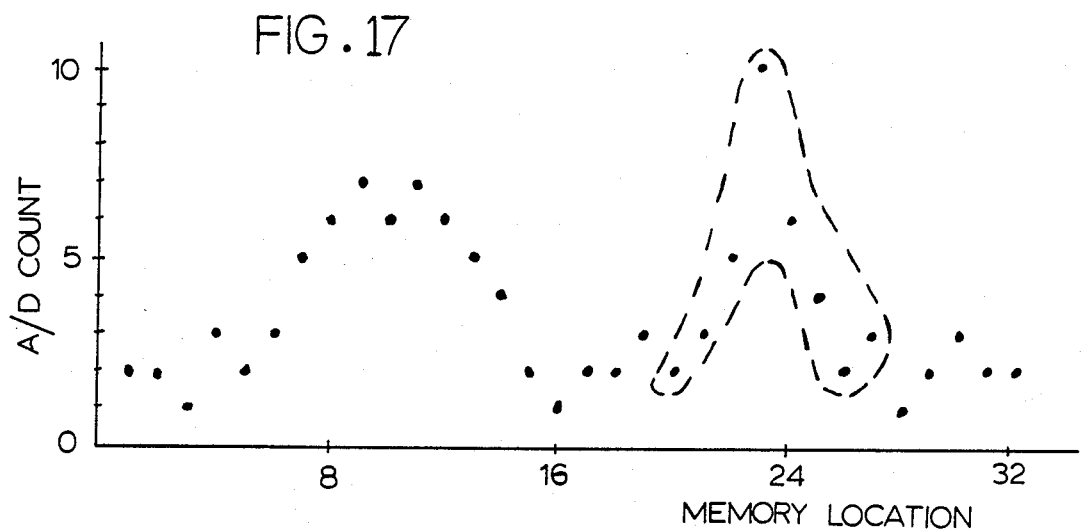

As previously explained, the SAW receiver performs what is essentially a spectrum analysis on the signal resulting in a waveform depicted in FIG. 15. That waveform is fed to the detector/digitizer 70 which takes the envelope of the wave, and digitizes the envelope waveform. FIG. 16 depicts the envelope waveform at the output of the video amplifier 82. FIG. 17 depicts the digitized spectrum waveform at the output of the analog to digital converter 84. The spectrum of FIG. 17 is a plot of the count from the converter 84 versus the memory location in the memories 88 and 90 of the data corresponding to the count. As shown by FIG. 17, in this particular example the smallest spectrum value in accordance with the flow chart of FIG. 11 has a one count and represents zero power. The peak power has a ten count. The power threshold is shown by the average of the points located within the dashed lines of FIG. 17. The power threshold averaging bandwidth is chosen to be greater than the bandwidth of signals from solid targets, but less than the bandwidth of signals from atmospheric backscatter.

Figure 18:
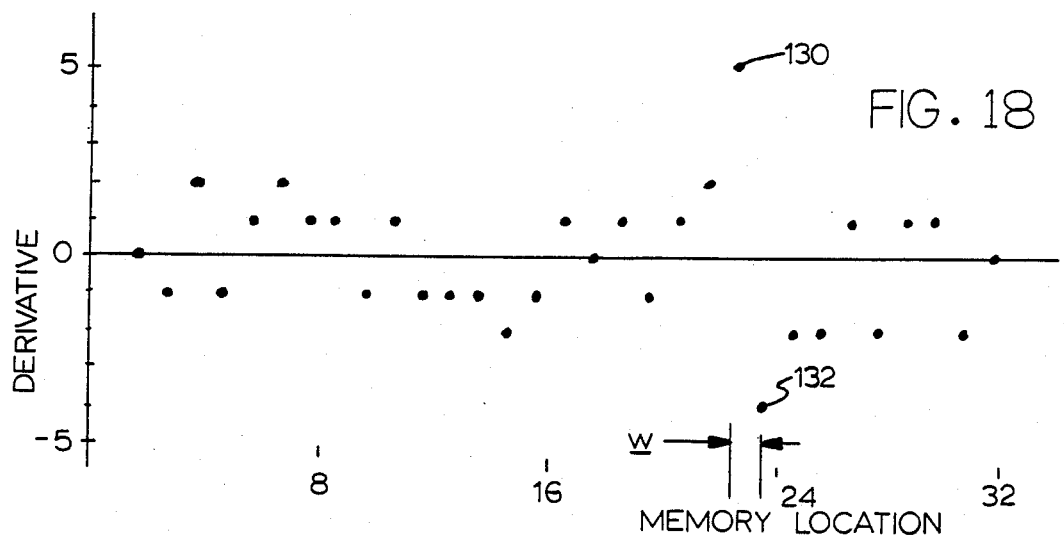

FIG. 18 is the derivative of the waveform of FIG. 17. The maximum derivative is shown at 130 and the minimum derivative is shown at 132. The width difference between the maximum and minimum derivatives is shown by w, and is used to determine if the peak width is less than the width threshold in accordance with the flow charts of FIGS. 10 and 11.

If the spectrum meets the threshold tests as shown by the flow chart of FIG. 10, the velocity sample is determined to be valid, and is averaged with corresponding data from other valid velocity samples. These average values are then used to calculate velocity.

In this way, atmospheric backscatter and noise signals are rejected based on bandwidth and amplitude thresholds, while the legitimate doppler signal is enhanced using the spectral averaging and derivative processing techniques heretofore described.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A laser doppler velocimeter with laser backscatter discrimination for determining the relative velocity between an optical platform and another target, comprising:
   means for generating a laser beam and directing said beam toward said target;
   detector means for producig a doppler signal in response to the detection of said laser beam;
   means for rejecting selected noise and backscatter signals from the doppler signal with band widths and amplitudes outside selected thresholds; and
   means for enhancing the legitimate doppler signal from the target further comprising means for taking a selected number of spectra of the detected doppler signal, means for averaging said spectra to produce data from which a velocity sample is determined, means for determining the minimum and maximum derivatives of the average spectrum, and means for rejecting the velocity sample if the width difference between the frequencies of minimum and maximum derivatives exceeds a predetermined threshold.

2. The device of claim 1 wherein said means for enhancing further comprises means for producing a waveform from a spectral analysis of each spectrum over a selected bandwidth.

3. The device of claim 2 wherein said spectral analysis is performed by a surface acoustic wave compressive receiver.

4. The device of claim 2 further comprising an envelope detector for detecting the envelope of the waveform from the spectral analysis, a digitizer for digitizing the envelope waveform, means for averaging the digital values of each spectrum with corresponding digital values of other spectra, and means for determining velocity from data representing the average spectrum.

5. The device of claim 2 further comprising means for mixing said doppler signal with a mix frequency to place the legitimate doppler signal within the selected bandwidth.

6. The device of claim 3 further comprising means for mixing said doppler signal with a mix frequency to place the legitimate doppler signal within the bandwidth of the surface acoustic wave compressive receiver.

7. The device of claim 5 wherein said mix frequency is generated in response to data representing an estimate of the frequency of the legitimate doppler signal and an estimate of the rate of change of frequency of the legitimate doppler signal.

8. The device of claim 7 further comprising means for measuring the frequency of the mix frequency and for generating data representing the accurate measure of said mix frequency.

9. A laser doppler velocimeter with laser backscatter discrimination for determining the relative velocity between an optical platform and another target, comprising: means for generating a laser beam and directing said beam toward said target, detector means for producing a doppler signal in response to the detection of said laser beam, means for filtering said doppler signal to exclude those signals outside a selected bandwidth, means for mixing the resultant filtered signal with a first mix frequency, means for mixing the waveform from the first mixing with a second mix frequency to place the legitimate doppler signal within a pre-selected bandwidth, means for filtering the resultant signal to exclude that portion of the signal outside the pre-selected bandwidth, means for producing a spectral analysis of the filtered signal within the pre-selected bandwidth to produce a waveform of the spectrum, means for detecting the envelope of the spectrum waveform, means for digitizing the envelope waveform to produce digital values representing the spectrum of the detected doppler signal, means for averaging the digital values of each spectrum with corresponding digital values of other spectra, means for determining the minimum and maximum derivatives of the average spectrum, means for determining the peak power of the average spectrum, and means for determining velocity from data representing the average spectrum if the width difference between the frequencies of minimum and maximum derivatives is narrower than a width threshold and if the peak power is greater than a power threshold.

* * * * *